US 8,601,514 B1

(12) United States Patent
Kellum et al.

(10) Patent No.: US 8,601,514 B1
(45) Date of Patent: Dec. 3, 2013

(54) PC MEDIA CENTER AND EXTENSION DEVICE FOR A HOME ENTERTAINMENT SYSTEM

(75) Inventors: John M. Kellum, Seattle, WA (US); Charles R. Broadus, Bothell, WA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1492 days.

(21) Appl. No.: 10/259,200

(22) Filed: Sep. 27, 2002

(51) Int. Cl.
*H04N 5/445* (2011.01)

(52) U.S. Cl.
USPC ............................................. 725/54; 725/153

(58) Field of Classification Search
USPC ........... 725/54, 78, 80, 82, 85, 89, 90, 91, 98, 725/100, 103, 110, 112, 114, 120, 127, 131, 725/133, 139, 141, 149, 151, 153
See application file for complete search history.

(56) References Cited

U.S. PATENT DOCUMENTS

| | | | |
|---|---|---|---|
| 5,138,649 A | 8/1992 | Krisbergh et al. | |
| 5,335,277 A * | 8/1994 | Harvey et al. | 380/242 |
| 5,353,121 A | 10/1994 | Young et al. | |
| 5,532,754 A | 7/1996 | Young et al. | |
| 5,673,401 A | 9/1997 | Volk et al. | |
| 5,675,390 A | 10/1997 | Schindler et al. | 348/552 |
| 5,884,039 A | 3/1999 | Ludwig et al. | |
| 5,886,732 A | 3/1999 | Humpleman | 348/10 |
| 5,949,328 A | 9/1999 | Latty | |
| 5,987,256 A | 11/1999 | Wu et al. | |
| 5,990,927 A | 11/1999 | Hendricks et al. | |
| 6,097,441 A | 8/2000 | Allport | 348/552 |
| 6,167,443 A * | 12/2000 | Decker et al. | 709/219 |
| 6,198,479 B1 | 3/2001 | Humpleman et al. | 345/329 |
| 6,202,211 B1 * | 3/2001 | Williams, Jr. | 725/78 |
| 6,289,169 B1 | 9/2001 | Okuyama | 386/83 |
| 6,378,000 B1 | 4/2002 | Akatsu et al. | 709/245 |
| 6,425,129 B1 | 7/2002 | Sciammarella et al. | |
| 6,481,013 B1 | 11/2002 | Dinwiddie et al. | 725/80 |
| 6,510,152 B1 | 1/2003 | Gerszberg et al. | |
| 6,590,604 B1 | 7/2003 | Tucker et al. | |
| 6,622,307 B1 | 9/2003 | Ho | |
| 6,640,239 B1 | 10/2003 | Gidwani | |
| 6,678,737 B1 * | 1/2004 | Bucher | 709/231 |

(Continued)

FOREIGN PATENT DOCUMENTS

WO     WO 00/65429     11/2000

OTHER PUBLICATIONS

Office Action mailed Apr. 3, 2008, for U.S. Appl. No. 10/261,071, filed Sep. 30, 2002.

(Continued)

*Primary Examiner* — Brian Pendleton
*Assistant Examiner* — Olugbenga Idowu
(74) *Attorney, Agent, or Firm* — Troy A. Van Aacken (57) ABSTRACT

Within a media center extension device, a first media signal is received from a media source and encoded into a first media stream, which is sent via a network to a personal computer media center. Within the personal computer media center, the first media stream is stored within a storage device, such as a hard disk drive. Also within the personal computer media center, a second media stream is retrieved from the storage device, which is sent via the network to the media center extension device. Within the media center extension device, the second media stream is decoded into a second media signal, which is rendered for display on a display device.

58 Claims, 10 Drawing Sheets

(56) References Cited

U.S. PATENT DOCUMENTS

| | | | |
|---|---|---|---|
| 6,889,385 B1 * | 5/2005 | Rakib et al. | 725/119 |
| 6,909,849 B1 | 6/2005 | Staley | |
| 6,957,396 B2 | 10/2005 | Iwamura | |
| 6,976,228 B2 | 12/2005 | Bernhardson | |
| 7,139,983 B2 | 11/2006 | Kelts | |
| 7,200,857 B1 | 4/2007 | Rodriguez et al. | |
| 2002/0051083 A1 | 5/2002 | Aratani et al. | |
| 2002/0053081 A1 * | 5/2002 | Griggs | 725/39 |
| 2002/0057893 A1 | 5/2002 | Wood et al. | |
| 2002/0059625 A1 * | 5/2002 | Kurauchi | 725/91 |
| 2002/0095615 A1 * | 7/2002 | Hastings et al. | 714/4 |
| 2002/0095689 A1 * | 7/2002 | Novak | 725/151 |
| 2002/0104090 A1 | 8/2002 | Stettner | |
| 2002/0174444 A1 * | 11/2002 | Gatto et al. | 725/133 |
| 2003/0066082 A1 | 4/2003 | Kliger et al. | |
| 2003/0090524 A1 | 5/2003 | Segerberg et al. | |
| 2003/0117440 A1 | 6/2003 | Hellyar et al. | |
| 2003/0126242 A1 | 7/2003 | Chang | |
| 2003/0154485 A1 * | 8/2003 | Johnson et al. | 725/89 |
| 2003/0188320 A1 | 10/2003 | Shing | |
| 2004/0031058 A1 | 2/2004 | Reisman | |
| 2004/0049794 A1 | 3/2004 | Shao et al. | |
| 2004/0244056 A1 * | 12/2004 | Lorenz et al. | 725/135 |
| 2004/0250273 A1 | 12/2004 | Swix et al. | |
| 2004/0261099 A1 * | 12/2004 | Durden et al. | 725/32 |
| 2005/0028208 A1 * | 2/2005 | Ellis et al. | 725/58 |
| 2005/0226324 A1 * | 10/2005 | Ouyang et al. | 375/240.12 |
| 2005/0251827 A1 * | 11/2005 | Ellis et al. | 725/47 |
| 2006/0174266 A1 | 8/2006 | Gatto et al. | |
| 2007/0288958 A1 | 12/2007 | Knudson et al. | |

OTHER PUBLICATIONS

Office action mailed Feb. 22, 2008, for U.S. Appl. No. 10/260,738, filed Sep. 30, 2002.
Office Action mailed Feb. 6, 2008, for U.S. Appl. No. 10/464,826, filed Jun. 18, 2003.
Office Action mailed May 29, 2008, for U.S. Appl. No. 10/260,740, filed Sep. 30, 2002.
Office Action mailed Jan. 11, 2008, for U.S. Appl. No. 10/260,740, filed Sep. 30, 2002.
Office Action mailed May 4, 2007, for U.S. Appl. No. 10/261,071, filed Sep. 30, 2002.
Office Action mailed Nov. 14, 2007, for U.S. Appl. No. 10/261,071, filed Sep. 30, 2002.
Office Action mailed Feb. 22, 2008, for U.S. Appl. No. 10/260,739, filed Sep. 30, 2002.
Notice of Allowance mailed Mar. 5, 2008, for U.S. Appl. No. 10/260,700, filed Sep. 30, 2002.
Office Action mailed Apr. 27, 2009 in U.S. Appl. No. 10/260,740, filed Sep. 30, 2002.
Office Action mailed Nov. 13, 2008 in U.S. Appl. No. 10/260,740, filed Sep. 30, 2002.
Office Action mailed Aug. 22, 2007 in U.S. Appl. No. 10/260,740, filed Sep. 30, 2002.
Office Action mailed Mar. 19, 2009 in U.S. Appl. No. 10/261,071, filed Sep. 30, 2002.
Office Action mailed Oct. 3, 2008 in U.S. Appl. No. 10/261,071, filed Sep. 30, 2002.
Office Action mailed Mar. 17, 2009 in U.S. Appl. No. 10/260,738, filed Sep. 30, 2002.
Office Action mailed Sep. 11, 2008 in U.S. Appl. No. 10/260,738, filed Sep. 30, 2002.
Office Action mailed Sep. 30, 2008 in U.S. Appl. No. 10/260,739, filed Sep. 30, 2002.
Office Action mailed Oct. 22, 2009 in U.S. Appl. No. 10/261,071, filed Sep. 30, 2002.
Office Action mailed Nov. 23, 2009 in U.S. Appl. No. 10/260,738, filed Sep. 30, 2002.
Office Action mailed Aug. 22, 2007, for U.S. Appl. No. 10/260,700, filed Sep. 30, 2002.
Office Action mailed Aug. 22, 2007, for U.S. Appl. No. 10/260,740, filed Sep. 30, 2002.
Office Action mailed Sep. 10, 2007, for U.S. Appl. No. 10/464,826, filed Jun. 18, 2003.

* cited by examiner

PC MEDIA CENTER AND EXTENSION DEVICE FOR A HOME ENTERTAINMENT SYSTEM

BACKGROUND

1. Field of the Invention

The present invention relates generally to home entertainment systems. More specifically, the present invention relates to a PC media center and extension device for a home entertainment system.

2. Description of Related Background Art

As interactive television (ITV) becomes more popular, greater demands are being placed on cable and satellite set top boxes (STBs) used in home entertainment systems. Popular STBs, such as the Motorola™ DCT2000™, are not sufficiently powerful to implement many of the most requested ITV features, such as videoconferencing, personal video recording (PVR), video and photo editing, and so forth. These and other features would elevate an STB to the status of a "home media center" that provides access to all forms of media—video, audio, text, etc.—using a television set.

Newer, more advanced STBs are needed to implement home media centers, but subscribers may be unwilling to pay for them. Likewise, many cable and satellite providers are not able to advance the cost of $500 to $1,000 per subscriber for the new STBs.

DETAILED DESCRIPTION

Reference is now made to the figures in which like reference numerals refer to like or similar elements. For clarity, the first digit or digits of a reference numeral indicates the figure number in which the corresponding element is first used.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

As used herein, the term "coupled" refers not only to components that are directly connected, but also to components that are connected via one or more other components. Hence, the term "coupled" may also refer to components that are in communication with one another, although no physical or direct connection may exist.

Furthermore, the described features, structures, or characteristics may be combined in any suitable manner in one or more embodiments. In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention.

Figure 1:
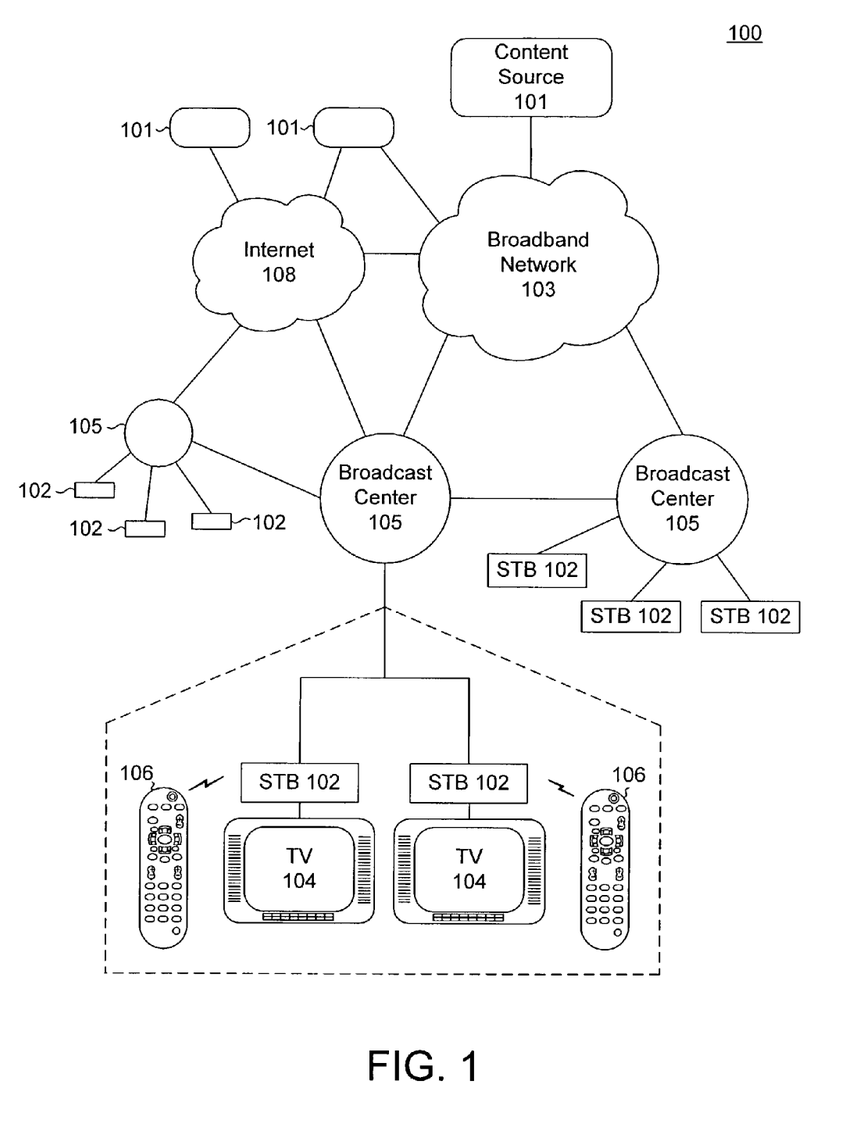
FIG. 1 is a block diagram of a system for distributing media content to subscribers.

As illustrated in FIG. 1, a typical system 100 for distributing media content to subscribers includes one or more content sources 101 linked to plurality of set top boxes (STBs) 102 by a broadband network 103. As used herein, the term "media content" should be broadly construed to include video and/or audio content, pictures, animations, text, software programs, etc. As such, content sources 101 may include television networks, websites, video servers, music servers, software archives, databases, and the like.

An STB 102 receives encoded television signals and data from the content source(s) 101 via the network 103 and displays the same on a television (TV) 104 or similar display device. As its name implies, an STB 102 is typically located in close proximity to the TV 104 (i.e. the STB 102 and the TV 104 are "collocated"). Conventionally, each TV 104 must have its own STB 102 in order to receive and display media content.

The broadband network 103 is typically a cable TV network or a direct broadcast satellite (DBS) network, although other networks are possible. The STBs 102 may be coupled to the network 103 directly or through one or more broadcast centers 105.

Within a cable TV network, a broadcast center 105 is referred to as a "head-end", which is a centrally-located facility within a community in which TV programming is received from a local cable TV satellite downlink or other source and packaged for transmission to subscriber homes. A broadcast center 105 may also be embodied as a satellite broadcast center within a DBS network.

Broadcast centers 105 may be coupled directly to one another or through the broadband network 103. In some cases, broadcast centers 105 may be connected via a separate network, one particular example of which is the Internet 108. Communication over the Internet 108 is accomplished using TCP/IP and other standard protocols.

For each STB 102, a remote control 106 is generally provided for convenient remote operation of the STB 102 and the TV 104. The remote control 106 may use infrared (IR), radio frequency (RF), or other wireless technologies to transmit control signals to the STB 102 and the TV 104.

Figure 2:
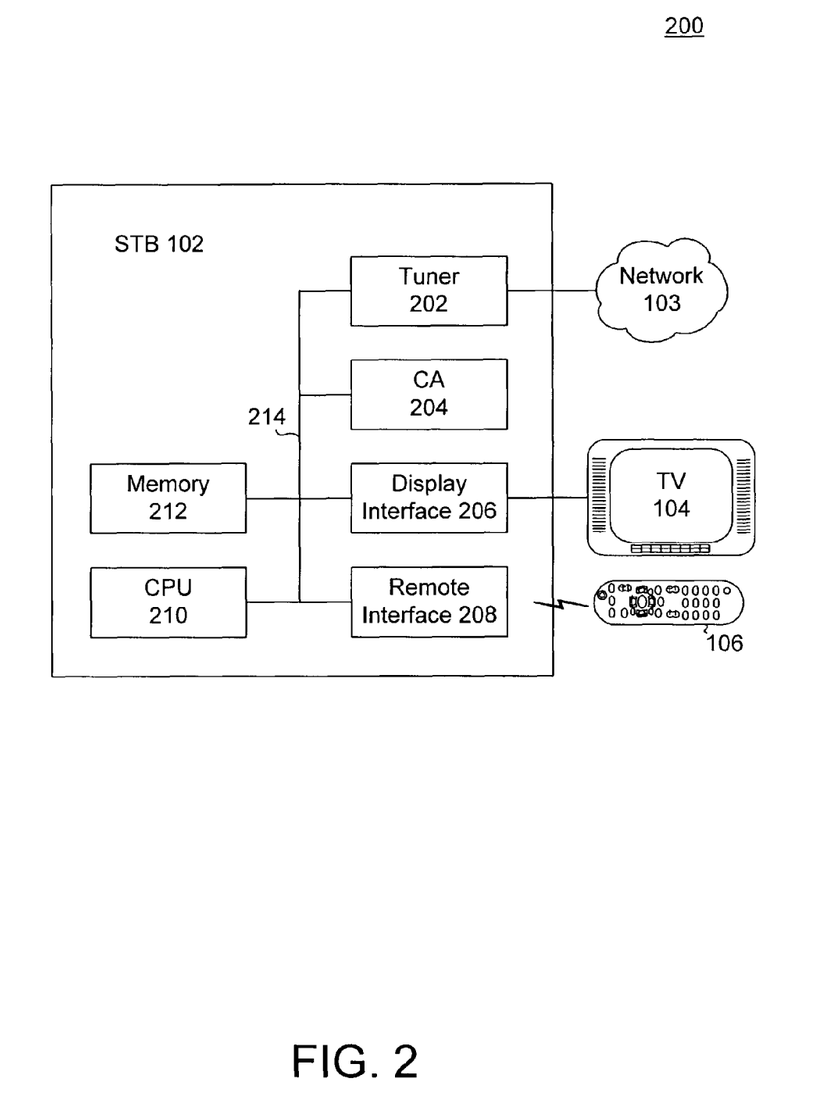
FIG. 2 is a block diagram of a standard set top box (STB)

FIG. 2 is a block diagram of a home entertainment system 200 including a standard STB 102, such as a Motorola™ DCT2000™. As depicted, the STB 102 includes a tuner 202 for selectively receiving media content from the broadband network 103 on different channels or frequencies. Various analog tuners 202 are available, such as the Broadcom™ BCM 7031™.

Increasingly, TV broadcasts are being digitally encoded and multiplexed to maximize bandwidth usage. For instance, "digital" cable utilizes MPEG (Moving Pictures Experts Group) compression to provide subscribers with many more channels than would be possible using analog techniques.

Accordingly, a "digital" tuner 202 may include circuitry for selectively demodulating, demultiplexing, and decoding such content.

The STB 102 may also include a conditional access (CA) device 204 for decrypting media content for premium and pay-per-view (PPV) channels or services (e.g., HBO™, Showtime™, OnDemand™). A CA device 204 makes use of both scrambling and encryption technologies to prevent reception of a signal by unauthorized STBs 102. In one technique, encrypted messages, known as Entitlement Control Message (ECM) and Entitlement Management Message (EMM), are used. CA devices 204 and techniques are known in the art and will not be discussed in greater detail.

The STB 102 further includes a display interface 206 for rendering media content on an attached display device, such as a TV 104. A display interface 206 typically includes a graphical processor, a memory (frame buffer), and various other supporting hardware. A variety of display interfaces 206 are known, such as the ATI™ Xilleon™ 215s.

The STB 102 also includes a remote interface 208 for receiving and decoding control signals sent by remote control 106. As noted, various wireless techniques may be used, such as infrared (IR), radio frequency (RF), or the like. In one configuration, the remote interface 208 is embodied as an ATMEL™ Mega161™ IR microcontroller.

Typically, the STB 102 includes a memory 212 comprising a combination of one or more standard RAM, ROM, or EEPROM devices. The memory may be used to store user settings, EPG (Electronic Program Guide) data, an operating system (such as Windows CE™ or Linux™), middleware (such as Liberate™), and the like.

The STB 102 also typically includes a CPU 210 for controlling the operation of the STB 102, including the other components thereof, which are coupled to the CPU 210 via a bus 214. The CPU 210 may be embodied as a microprocessor (e.g., Motorola™ 68331), microcontroller, digital signal processor (DSP), or other device known in the art. The CPU 210 performs logical and arithmetic operations based on program code stored within the memory 212.

As previously explained, a growing number of subscribers are demanding advanced ITV features, such as videoconferencing, personal video recording (PVR), video and photo editing, and the like. However, such features require a more advanced STB 302 of the type depicted in the home entertainment system 300 of FIG. 3. One example of an advanced STB 302 is the Motorola™ DCT5200™ set top terminal.

Figure 3:
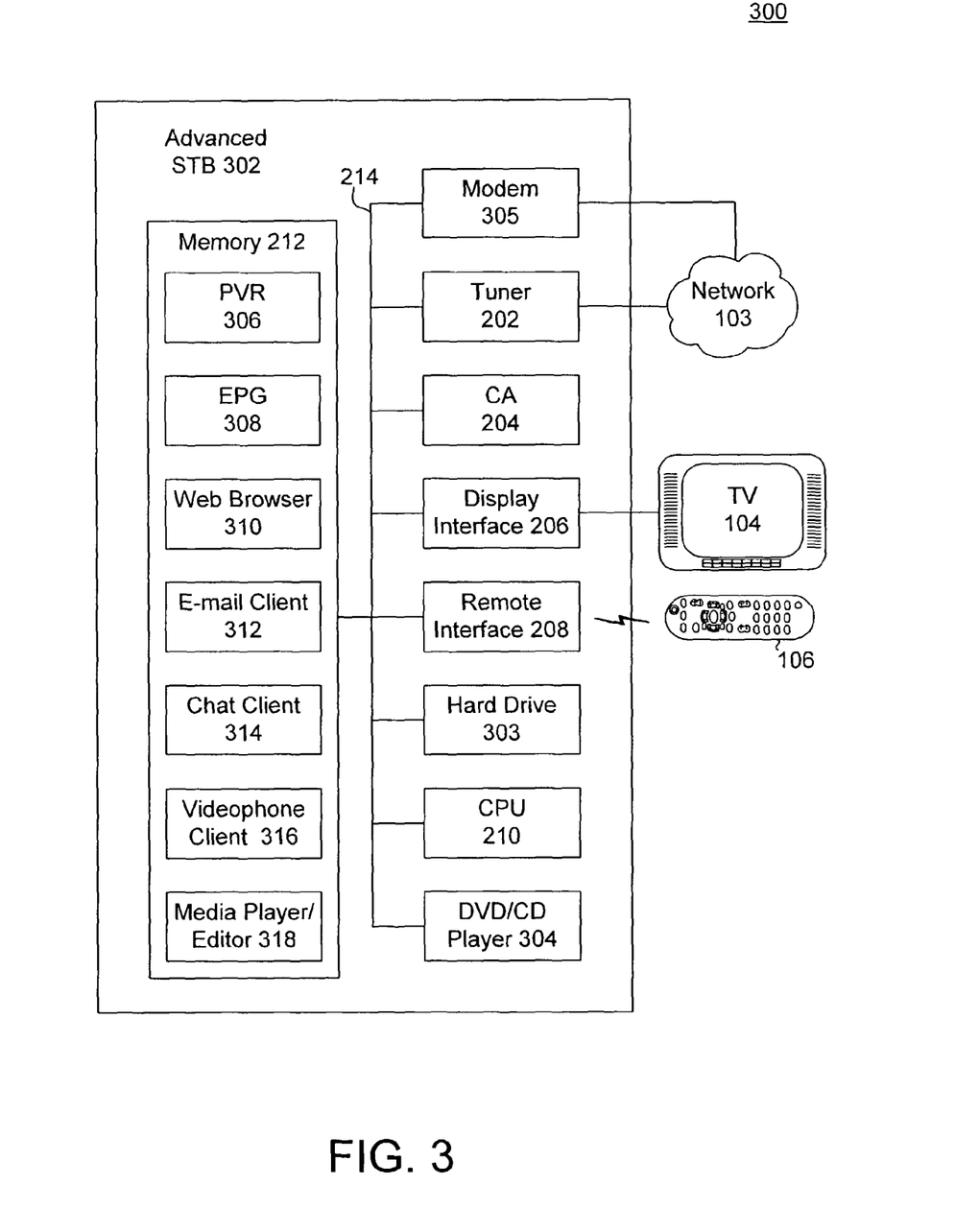
FIG. 3 is a block diagram of an advanced STB.

As illustrated, each of the components of the STB 102 are also represented within the advanced STB 302, e.g., the tuner 202, CA device 204, display interface 206, remote interface 208, CPU 210, and memory 212. Typically, however, many of the components of the advanced STB 302 will be faster, have a greater capacity, etc., than those of the STB 102. For instance, the Motorola™ DCT5200™ may have up to 128 MB of RAM, while the DCT2000™ is limited to 7 MB.

The advanced STB 302 also includes a number of components that are not generally found in a standard STB 102. For instance, the advanced STB 302 may include a hard drive 303 for mass storage, as well as a DVD and/or CD player 304 for playing optical media. In addition, the advanced STB 302 may include a modem 305, such as a DOCSIS (Data Over Cable Service Interface Specification) cable modem, for accessing data via the network 103 and/or the Internet 108.

To enable advanced ITV features, the memory 212 of the advanced STB 302 includes a number of software modules. Of course, any of described modules may be implemented using various combinations of software, hardware, and/or firmware.

For instance, the memory 212 may include a personal video recording (PVR) module 306 to facilitate digital recording of media content. The popularity of PVR systems, such as TiVo™ and ReplayTV™, has tremendously increased in recent years. PVR systems provide a wide variety of desirable functions, such as scheduled recording of TV broadcasts for time-shifting purposes, pausing (buffering) of live TV, instant replays, and the like.

The memory 212 may also include an EPG (electronic programming guide) module 308 that provides a subscriber with a view of upcoming television programming. The EPG module 308 may display programming information in various formats, such as a timeline, grid, or the like, allowing a subscriber to easily view upcoming or current programming. In addition, the EPG module 308 may interact with the PVR module 306 to allow a subscriber to select programs for recording directly from an EPG listing. The EPG module 308 obtains programming data through the modem 305 from the Internet 108, a content source 101, or servers accessible via the network 103.

The memory 212 may further include a web browser 310, such as a version of Microsoft Internet Explorer™, to facilitate access to web content within the Internet 108. Similarly, the memory 212 may include an e-mail client 312, such as Microsoft Outlook™, a chat client 314, such as MSN Messenger™, a videophone client 316, such as Microsoft Netmeeting™, and a media player/editor 318, such as Windows Media Player™ and/or Windows Movie Maker™.

Unfortunately, advanced STBs 302 of the type depicted in FIG. 3 are relatively expensive. Moreover, a substantial installed base of standard STBs 102 already exists, making it difficult for cable and satellite provider to justify upgrading to the advanced STBs 302 merely to add new ITV features. Nevertheless, demand for the features exists, and a provider that can satisfy the demand at a reasonable cost will have a distinct competitive advantage.

Figure 4:
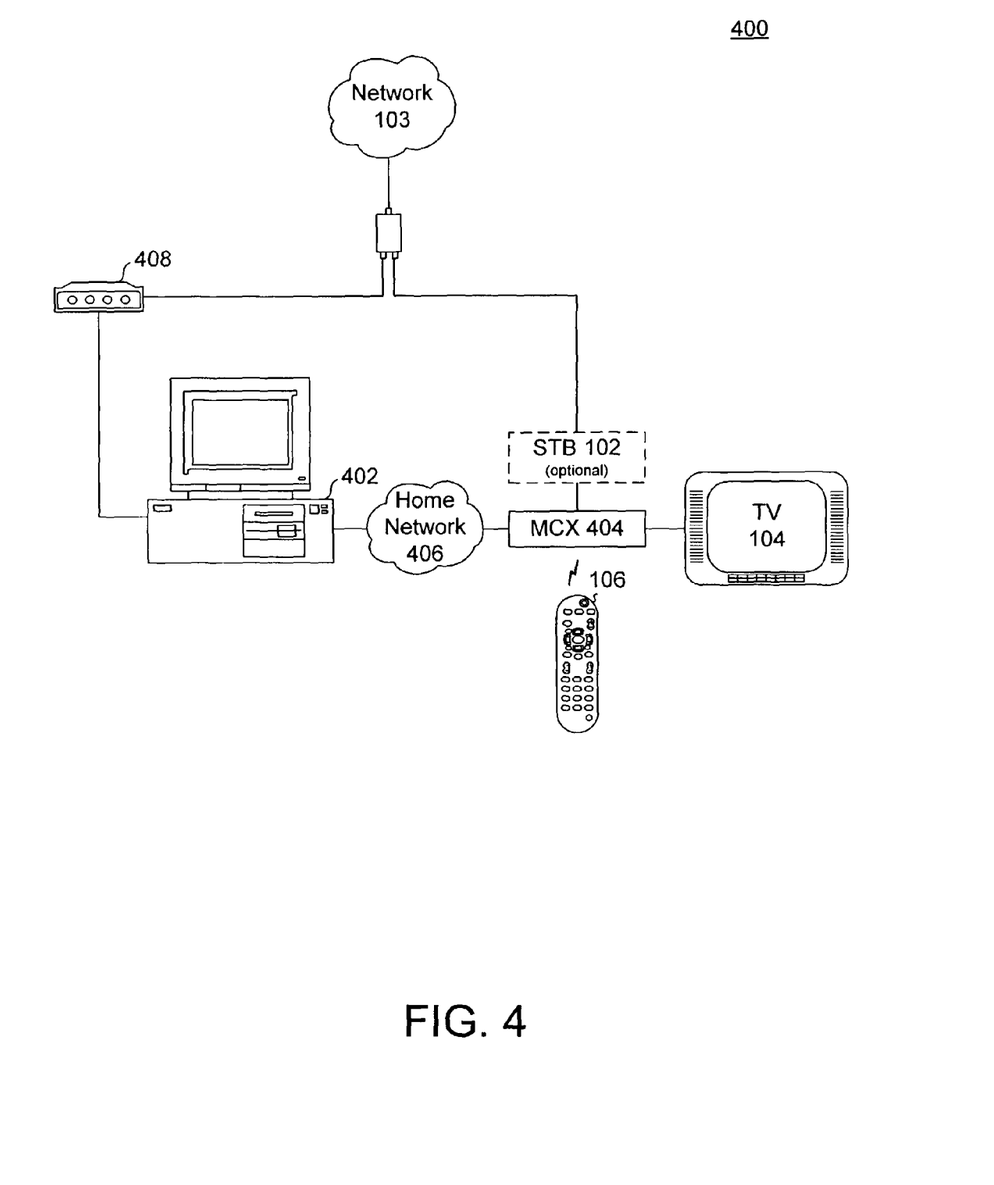
FIG. 4 is a block diagram of home entertainment system including a PC media center (PCMC) and a media center extension (MCX)

FIG. 4 is a block diagram of a home entertainment system 400 according to an embodiment of the invention that satisfies the demand for new ITV features without the cost of purchasing advanced STBs 302. In one configuration, a personal computer (PC) within a subscriber's home is transformed into a PC media center (PCMC) 402. In general, no hardware retrofitting is required. Rather, as explained in greater detail below, software programs are installed on the home PC to provide the media center functions.

In addition, a media center extension (MCX) 404 is provided. As described below, the MCX 404 includes many of the hardware components of an STB 102, but leverages the processing and storage capacity of the PCMC 402 to provide functionality comparable to an advanced STB 302 at a fraction of the cost.

The MCX 404 may be coupled to the PCMC 402 via an existing home network 406. The home network may be embodied as a 10/100 Mbps Ethernet, a 802.11b wireless network, a HomePNA™ network, a HomeCNA™ network, a HomePlug™ network, an IEEE 1394 network, a Bluetooth™ network, or any other suitable wired or wireless network.

As illustrated in FIG. 4, both the PCMC 402 and the MCX 404 may be coupled to the broadband network 103 in order to send and receive media content and other data. In certain configurations, the PCMC 402 may include an internal or external modem 408, such as a Motorola™ DOCSIS cable modem, for interfacing with the broadband network 103.

In various embodiments, the MCX 404 may be optionally coupled to a standard STB 102, such as a Motorola™ DCT2000™. As described in greater detail in connection with FIG. 7, the standard STB 102 may be used for channel tuning and conditional access (CA), which reduces the overall cost of the MCX 404 since hardware support for these features would not then be required within the MCX 404.

The MCX 404 may receive input from a standard IR or RF remote control 106. Likewise, the MCX 404 may produce output for a standard analog or digital TV 104 or similar display device.

Figure 5:
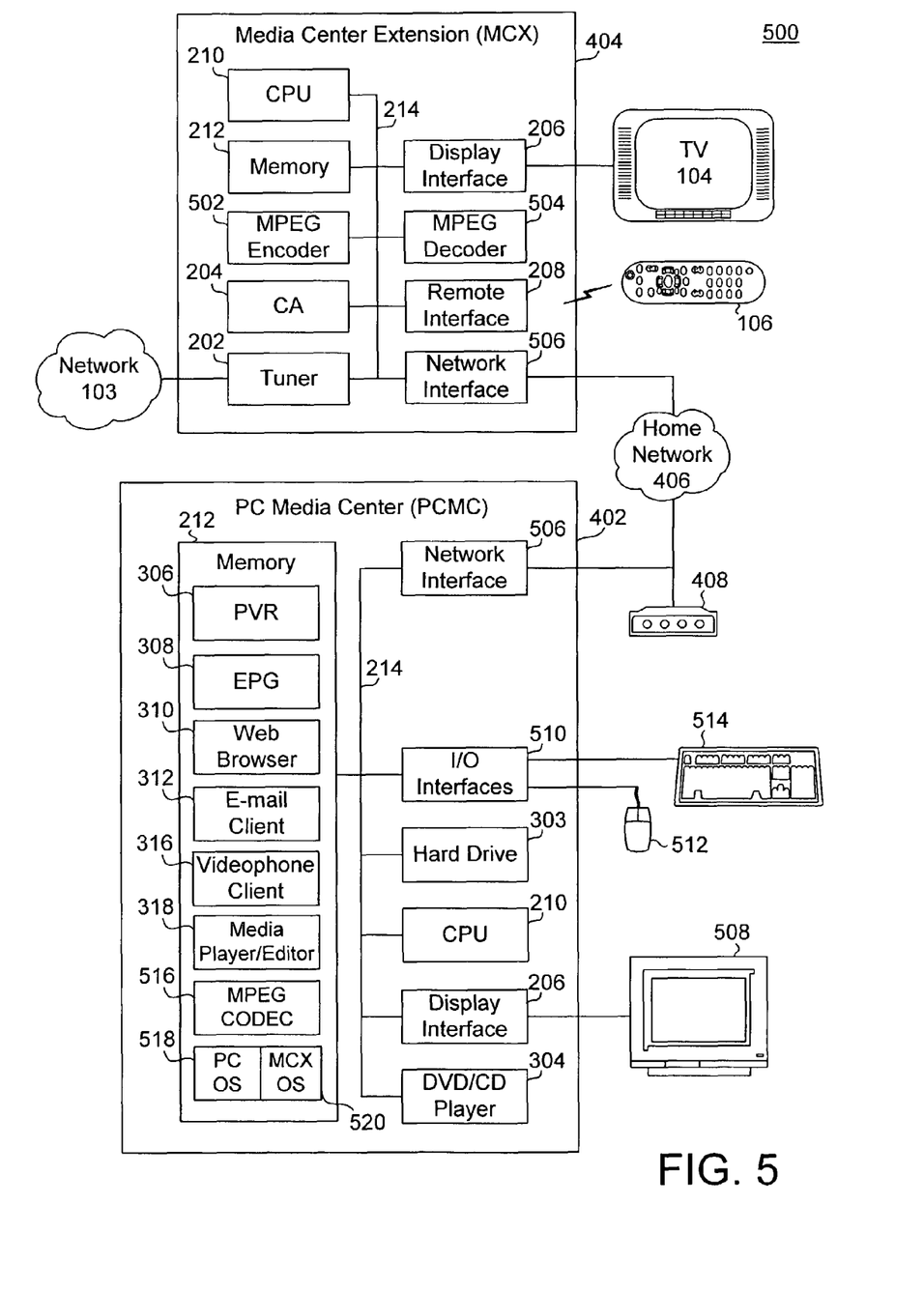
FIG. 5 is a block diagram of a home entertainment system showing details of a PCMC and MCX.

FIG. 5 is a detailed block diagram of a home entertainment system 500 according to an embodiment of the invention. As depicted, the MCX 404 may include components similar to those of a standard STB 102, including a tuner 202, CA device 204, display interface 206, remote interface 208, CPU 210, and memory 212, all of which may be interconnected via a bus 214.

In addition, the MCX 404 may include an MPEG encoder 502, such as an NEC™ µPD61xx encoder, for encoding or transforming audio/video signals received from the network 103 into media streams for transmission to the PCMC 402. The MCX 404 may also include an MPEG decoder 504 for decoding media streams received from the network 103 or the PCMC 402. The MPEG decoder 504 may be embodied as a separate MPEG decoding chip or as part of a display interface 206, such as an ATI™ Xilleon™ 215s. Of course, the MPEG encoder 502 and the MPEG decoder 504 may be embodied within a single chip or may be implemented using software.

While MPEG is used in a presently preferred embodiment, a variety of other encoding systems may be used within the scope of the invention, such as JPEG, JPEG-LS, H.261, and H.263. Accordingly, the invention should not be construed as being limited to MPEG encoding.

The MCX 404 may additionally include a network interface 506 for communicating with the PCMC 402 over the home network 406. The configuration of the network interface 506 will vary depending on the type of network 406. For instance, the network interface 506 may be embodied as a 10/100 Mbps Ethernet adapter, 802.11b adapter, an IEEE 1394 adapter, or the like.

The PCMC 402 may be implemented using a general purpose personal computer, such as a Dell™ Dimension™ 2200. Accordingly, the PCMC 402 may include various standard components similar to those of an advanced STB 302. For instance, the PCMC 402 may include a display interface 206 for driving a computer monitor 508, a CPU 210, a memory 212, a hard drive 303, a DVD/CD player 304, and so forth.

Furthermore, the PCMC 402 may include a network interface 506 for communicating with the MCX 404 over the home network 406. The network interface 506 may also be coupled to a modem 408 for communicating with the Internet 108 and/or the broadband network 103. Alternatively, the modem 408 may be included within the PCMC 402, itself, as an add-in board.

Additionally, the PCMC 402 may include various I/O interfaces 510 for communicating with various external devices. For instance, the PCMC 402 may include I/O interfaces 510 for receiving input from a mouse 512 and/or keyboard 514. Moreover, the PCMC 402 may include various standard I/O interfaces 510, such as serial ports, parallel ports, USB (universal serial bus) ports, IEEE 1394 (firewire) ports, and the like. All of the components of the PCMC 402 may be interconnected by a bus 214.

The memory 212 of the PCMC 402 may be configured with various software modules similar to those of the advanced STB 302. For instance, the memory 212 of the PCMC 402 may include a PVR module 306, an EPG module 308, a web browser 310, an e-mail client 312, a videophone client 316, and a media player/editor 318.

In addition, the memory 212 of the PCMC 402 may include an MPEG codec 516 (compressor/decompressor), which may be used to decode MPEG streams received from the MCX 404 as well as to encode MPEG streams to be sent to the MCX 404. While the MPEG codec 516 is depicted as a software component, a hardware implementation may be used within the scope of the invention. In such an embodiment, an add-in card, such as the Canopus™ MVR1000™ hardware MPEG-2 encoder, may be provided.

In addition to a PC operating system (OS) 518, such as Windows XP™, the memory 212 of the PCMC 402 may include an OS 520 for the MCX, such as Linux™. In certain configurations, the MCX 404 may boot (i.e., load the OS 520 into memory 212) from a copy stored within the PCMC 402. For instance, the network interface 506 of the MCX 404 may be compatible with the 3Com™ DynamicAccess™ managed PC boot agent or other network boot service. This eliminates the need for the MCX 404 to locally store the MCX OS 520 within a flash memory or hard drive 303.

Figure 6:
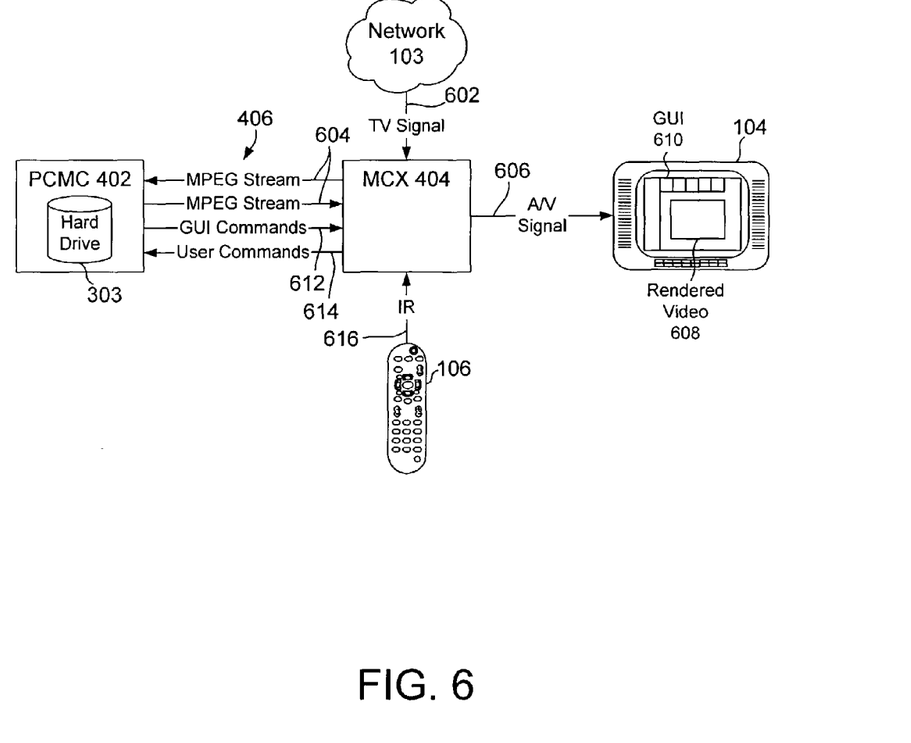
FIG. 6 is a dataflow diagram of the system of FIG. 5.

FIG. 6 depicts the flow of data through the system 500 of FIG. 5. As illustrated, a media signal 602, such as a TV signal, is received by an MCX 404 from the network 103. The media signal 602 may be an analog TV signal, a "digital" cable or satellite TV signal, a Video-on-Demand (VoD) signal, or other transmission.

In one configuration, the MCX 404 encodes the media signal 602 into an MPEG stream 604 and sends the MPEG stream 604 via the home network 406 to the PCMC 402. Where the media signal 602 is already digitally-encoded, the MCX 404 may simply relay the digitally-encoded media signal 602 to the PCMC 402. Within the PCMC 402, the MPEG stream 604 is recorded or stored in a hard drive 303, memory, or other digital storage device.

Once stored, the MPEG stream 604 may be used or manipulated in a variety of ways. For instance, the MPEG stream 604 may be edited using the media player/editor 318, sent to another subscriber using the videophone client 316 or the e-mail client 312, indexed for subsequent playback by the PVR module 306, etc.

In one configuration, a stored MPEG stream 604 is retrieved from the hard drive 303 and transported via the home network 406 to the MCX 404. The retrieved MPEG stream 604 may be one that was recorded by the PVR module 306, edited by the media player/editor 318, etc. Within the MCX 404, the MPEG stream 604 is decoded by the MPEG decoder 504 and converted by the display interface 206 into an A/V (audio/video) signal 606, which may be displayed as rendered video 608 on the TV 104.

In addition, the PCMC 402 may be responsible for creating and updating a graphical user interface (GUI) 610 on the TV 104. To accomplish this, the PCMC 402 sends GUI commands 612 to the MCX 404, which are used by the display interface 206 to generate the GUI 610. The GUI commands 612 may be embodied, for instance, as low-level VGA (Video Graphics Array) commands which may be directly processed by circuitry within the display interface 206. Alternatively, the GUI commands 612 may be graphical primitives understood by a thin-client module (not shown) within the MCX 404. In still other embodiments, the GUI commands 612 may include higher-level data objects, such as graphics and text. In certain configurations, the GUI commands 612 may be encoded into the MPEG stream 604.

The GUI 610 may provide an interface to various modules within the PCMC 402, such as the PVR module 306, EPG module 308, web browser 310, e-mail client 312, videophone client 316, media player/editor 318, or the like. For instance, the GUI 610 may display a listing of TV programs recorded by the PVR module 306 and allow a subscriber to select one or more of the TV programs for playback, deletion, etc. Likewise, the GUI 610 may display content retrieved by the web browser 310 from the Internet 108.

The PCMC 402 may be further responsible for receiving input from the remote control 106 and relaying certain user commands 614 or requests to the PCMC 402. For instance, the remote control 106 may send an IR command 616 to the MCX 404 in response to the user pressing a button. The IR command 616 is processed by the MCX 404 and, in certain configurations, relayed to the PCMC 402 as a user command 614.

As an example, suppose the TV signal 602 contains a TV program that is scheduled to be recorded by the PVR module 306 of the PCMC 402. The MCX 404 encodes the TV signal 602 into an MPEG stream 604, which is sent to the PCMC 402 where it is stored within the hard drive 303.

Later, a subscriber desires to watch the recorded TV program. The subscriber presses a designated button on the remote control for displaying the GUI 610 on the TV 104. An IR command 616 is sent to the MCX 404, which sends a corresponding user command 614 to the PCMC 402. In turn, the PCMC 402 generates GUI commands 612, which are sent to the MCX 404 and rendered as the GUI 610 on the TV 104.

Navigating the GUI 610 by means of the remote control 106, the subscriber initiates a command to display the recorded TV program. The PCMC retrieves or reads the appropriate MPEG stream 604 from the hard drive 303 and sends the same to the MCX 404 where it is rendered and displayed on the TV 104.

Figure 7:
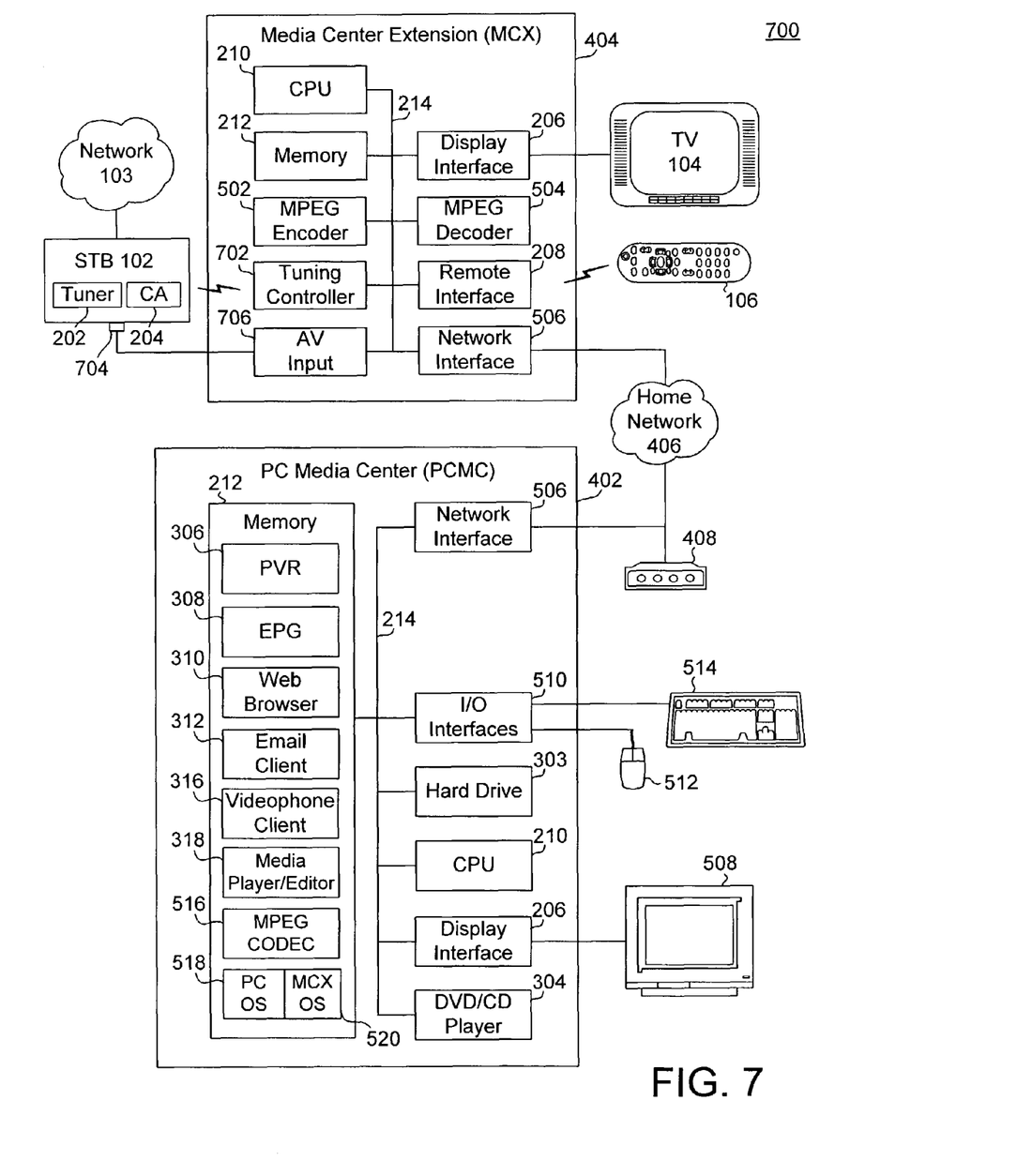
FIG. 7 is a detailed block diagram of an alternative home entertainment system showing details of a PCMC and MCX.

FIG. 7 is a detailed block diagram of a home entertainment system 700 according to an alternative embodiment of the invention. As previously explained, the MCX 404 may be optionally coupled to a standard STB 102, such as a Motorola™ DCT2000™. In such an embodiment, the standard STB 102 is leveraged for its tuner 202 and CA device 204, eliminating the need for such components within the MCX 404. Accordingly, the currently-installed base of standard STBs 102 need not be replaced and the overall cost of the MCX 404 is thereby reduced.

As depicted, the MCX 404 includes a remote tuning controller 702 for controlling the tuning of the STB 102. In one embodiment, the remote tuning controller 702 simulates a remote control 106 by transmitting appropriate tuning control signals to the STB 102. The remote tuning controller 702 may be embodied, for instance, as an IR emitter (e.g., IR Blaster™), which simulates a remote control 106 by emitting IR commands similar to those of the remote control 106. In alternative embodiments, the remote tuning controller may include a serial cable and suitable driving hardware for transmitting tuning control signals directly to a serial port of the STB 102. The Motorola™ DCT2000™, for example, includes such a serial port for receiving tuning control signals.

Conventionally, an A/V output 704 of the STB 102 is connected to the TV 104. However, in the depicted embodiment, the A/V output 704 of the STB 102 is coupled to an A/V input 706 of the MCX 404. Thus, the MCX 404 receives the same A/V signals that would normally have been received by the TV 104. Various types of A/V connections may be used depending on the capabilities of the STB 102, e.g., composite video, s-video, component video, stereo audio, optical/coaxial digital audio, RF audio/video, etc.

Figure 8:
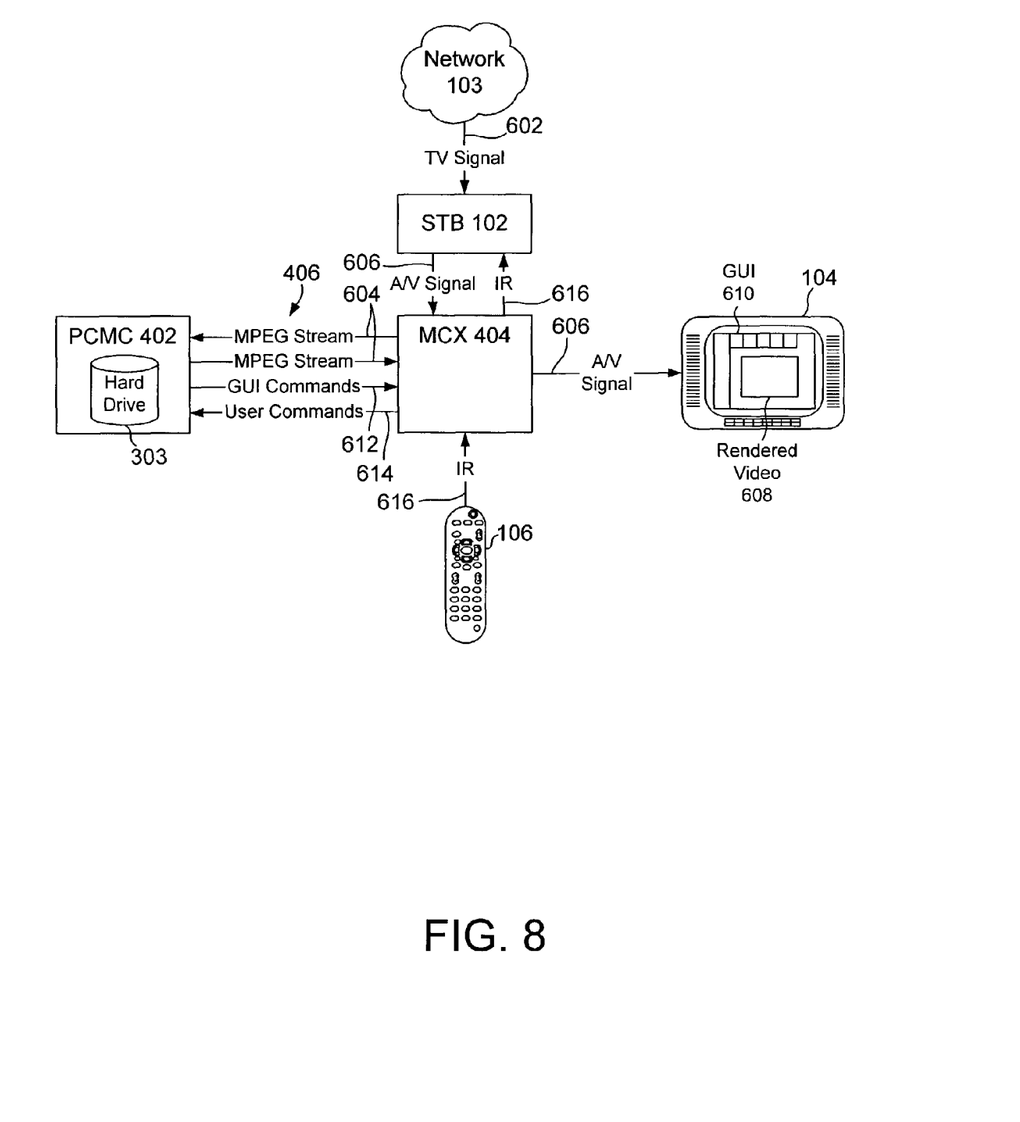
FIG. 8 is a dataflow diagram of the system of FIG. 6.

FIG. 8 depicts the flow of data through the system 700 of FIG. 7. The dataflow of FIG. 8 is similar to that of FIG. 6, except that the TV signal 602 is first received by the STB 102 rather than the MCX 404. The STB 102 generates an A/V signal 606, which is received by the MCX 404. Thereafter, the A/V signal 606 may be encoded, displayed, etc., as described with reference to FIG. 6.

The MCX 404, in turn, controls the tuning of the STB 102 with tuning command signals, e.g. IR commands 616. Thus, the STB 102 becomes an extension of the MCX 404, performing tuning and conditional access functions, while the MCX 404 can be reserved for encoding/decoding tasks and interfacing with the PCMC 402.

Figure 9:
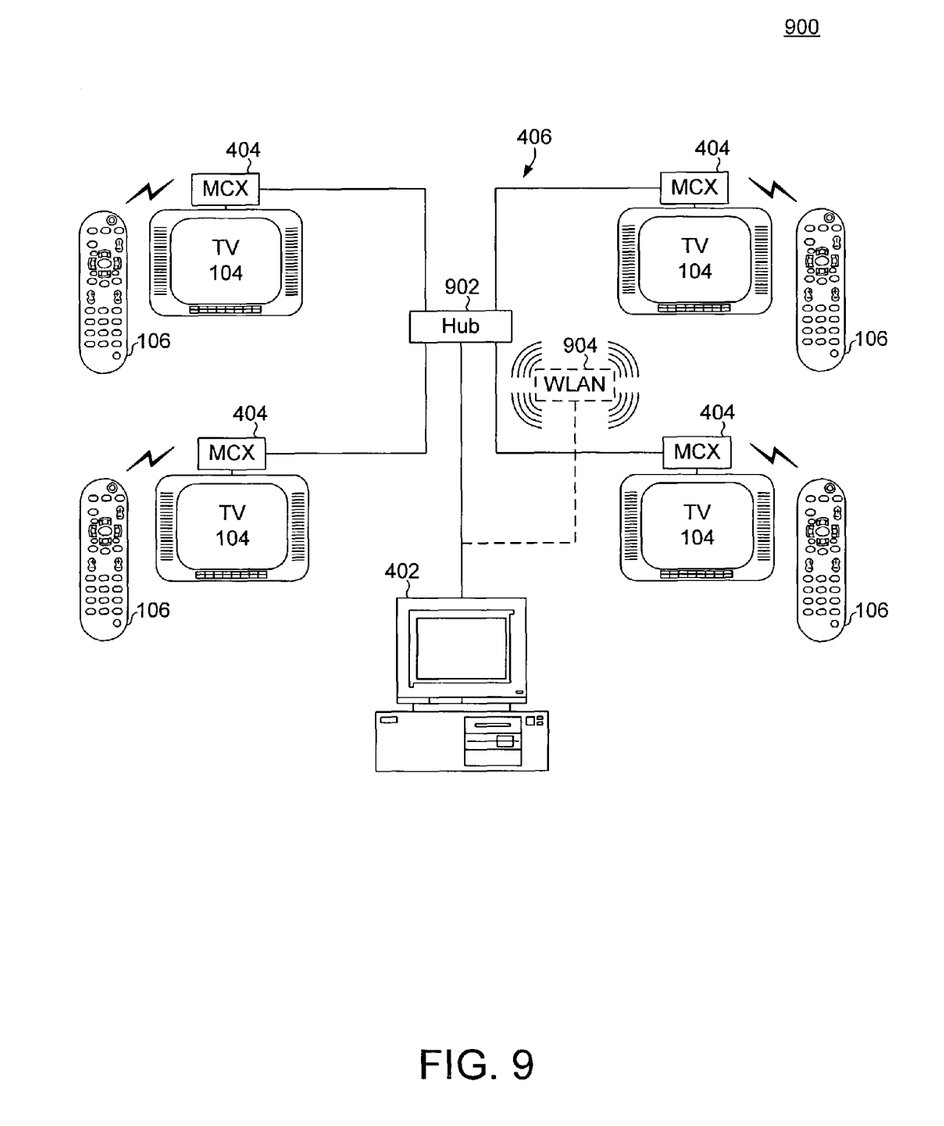
FIG. 9 is a block diagram of a home entertainment system including multiple televisions.

As shown in FIG. 9, a home entertainment system 900 may include any number of MCXs 404. For instance, a plurality of MCXs 404 may be in communication with a PCMC 402 via a hub 902 or wireless LAN 904 (WLAN). Each MCX 404 may be coupled to a separate TV 104 and have a separate remote control 106. Accordingly, an entire household may be serviced by a single PCMC 402, which would not be possible conventionally with an advanced STB 302.

Figure 10:
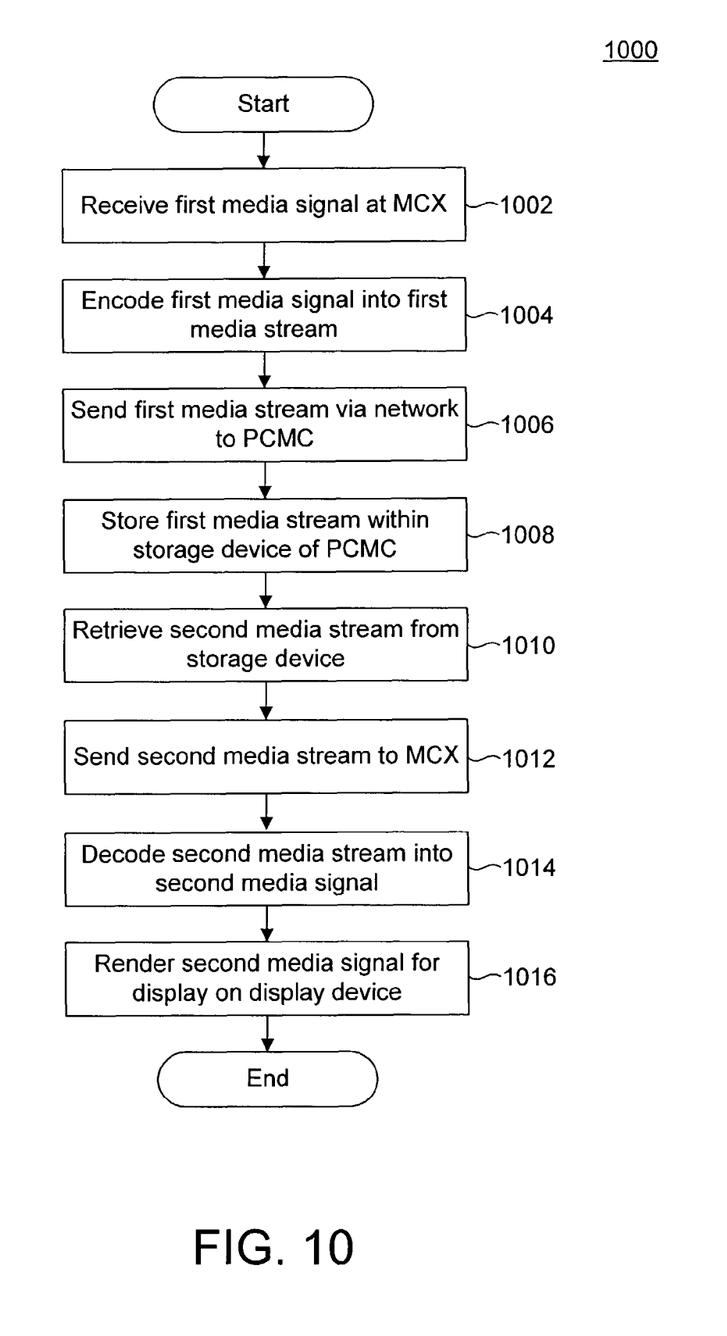
FIG. 10 is a flowchart of a method performed by a home entertainment system.

FIG. 10 is a flowchart of a method 1000 within a home entertainment system for processing and displaying media signals 602. A first media signal (e.g., TV signal) 602 is received 1002 at an MCX 404. Thereafter, the first media signal 602 is encoded 1004 into a first media stream 604 (e.g., MPEG or other data stream), which is sent 1006 via a home network 406 to a PCMC 402. The first media stream 604 is then stored 1008 within a storage device (e.g., hard disk) 303 of the PCMC 402.

Subsequently, a second media stream 604 is retrieved 1010 from the storage device 303 and sent 1012 to the MCX 404. The second media stream 604 may include or may be adapted from the first media stream 604. For instance, the second media stream 604 may be an edited version of the first media stream 604. Within the MCX 404, the second media stream is decoded 1014 and rendered 1016 for display on a television 104 or other display device.

In view of the foregoing, the present invention offers a number of advantages not found in conventional approaches. Advanced ITV features, such as videoconferencing, personal video recording, and the like, may be provided to subscribers without the inconvenience and expense of replacing currently-installed STBs 102 with advanced STBs 302. Moreover, existing home PCs, networks, and STBs 102 may be leveraged such that the only additional hardware requirement, i.e. an MCX 404, may be as simple and inexpensive as possible. Unlike conventional systems, the PCMC 402 and the TV 104 need not be collocated, making installation easier and reducing costs. Furthermore, multiple TVs 104 may be driven simultaneously by a single PCMC 402, which is not possible with conventional advanced STBs 302.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A media center extension device, wherein the media center extension device is connected to a set top box, a personal computer media center, a remote control device, and a display device, and wherein the media center extension device is to receive a first media signal directly from the set top box having a tuner used to tune to the first media signal, the media center extension device comprising:

an input to receive the first media signal tuned to by the set top box directly from the set top box;

an encoder within the media center extension device coupled to the input of the media center extension to encode the first media signal received directly from and tuned to by the set top box into a first media stream;

a network interface coupled to the encoder to send the first media stream via a home network from the media center extension to the personal computer media center;

a decoder coupled to the network interface to decode a second media stream into a second media signal, the second media stream being received via the home network from the personal computer media center on the network interface; and a display interface to render the second media signal on the display device.

2. The device of claim 1, wherein the second media stream originated from the first media stream.

3. The device of claim 1, the device further comprising:
a tuning controller to instruct the set top box to tune to the first media signal.

4. The device of claim 3, wherein the tuning controller comprises a remote control simulator.

5. The device of claim 3, wherein the tuning controller comprises a serial connection between the media center extension device and the set top box.

6. The device of claim 1, further comprising:
a wireless receiver to receive user commands from the remote control device.

7. The device of claim 6, wherein the network interface is to relay at least one user command to the personal computer media center.

8. The device of claim 1, further comprising:
a conditional access device to decrypt media signals.

9. The device of claim 1, wherein the set top box includes a conditional access device to decrypt media signals.

10. The device of claim 1, wherein the display interface is to render a graphical user interface (GUI) on the display device using graphical commands received from the personal computer media center through the home network.

11. The device of claim 1, wherein the personal computer media center comprises a storage device to store the encoded media streams received through the home network.

12. The device of claim 1, wherein the personal computer media center comprises a personal video recording (PVR) module to selectively record media streams received through the home network, and wherein the network interface is to receive a recorded media stream from the personal computer media center for the display interface to render.

13. The device of claim 1, wherein the personal computer media center comprises a media editing module to selectively edit media streams received through the home network, and wherein the network interface is to receive an edited media stream from the personal computer media center for the display interface to render.

14. The device of claim 1, wherein the personal computer media center comprises a web browser coupled to an Internet connection to receive web content, and wherein the network interface of the media center extension device is to receive graphical commands from the personal computer media center that the display interface uses to render the web content.

15. The device of claim 1, wherein the media center extension device is to boot from an operating system stored within the personal computer media center and received through the network interface.

16. The device of claim 1, wherein the media stream comprises an MPEG stream.

17. The device of claim 1, wherein the home network is one of an Ethernet and a wireless network.

18. A method comprising:
tuning to a first media signal from a media source using a tuner at a set top box;

transmitting the first media signal directly from the set top box to a media center extension device, wherein the media center extension device is connected to a set top box, a personal computer media center, a remote control, and a display device;

encoding the first media signal received directly from and tuned to by the set top box into a first media stream at the media center extension device;

sending the first media stream via a home network from the media center extension device to the personal computer media center;

receiving a second media stream from the personal computer media center at the media center extension device via the home network;

decoding the second media stream into a second media signal at the media center extension device; and providing the second media signal from the media center extension device for display and rendering on the display device.

19. The method of claim 18, wherein the second media stream originated from the first media stream.

20. The method of claim 18, further comprising:
instructing the set top box to tune to the first media signal.

21. The method of claim 20, wherein instructing comprises simulating the remote control device.

22. The method of claim 20, wherein instructing comprises transmitting control signals from the media center extension device to the set top box using a serial connection.

23. The method of claim 18, further comprising:
receiving user commands from the remote control device.

24. The method of claim 23, further comprising:
relaying at least one user command to the personal computer media center.

25. The method of claim 18, further comprising:
decrypting media signals using a conditional access device within the media center extension device.

26. The method of claim 18, further comprising:
decrypting the first media signal using a conditional access device at the set top box.

27. The method of claim 18, further comprising:
rendering a graphical user interface (GUI) on the display device using graphical commands received from the personal computer media center through the home network.

28. The method of claim 18, further comprising:
storing the encoded media streams received through the home network in a storage device of the personal computer media center.

29. The method of claim 18, wherein a personal video recording (PVR) module of the personal computer media center selectively records media streams received through the home network, the method further comprising:
receiving a recorded media stream from the personal computer media center for rendering on the display device.

30. The method of claim 18, wherein a media editing module of the personal computer media center selectively edits media streams received through the home network, the method further comprising:
receiving an edited media stream from the personal computer media center for rendering on the display device.

31. The method of claim 18, wherein a web browser of the personal computer media center is coupled to an Internet connection to receive web content, the method further comprising:

receiving graphical commands from the personal computer media center for rendering the web content on the display device.

32. The method of claim 18, further comprising:
booting from an operating system stored within the personal computer media center and received through the home network.

33. The method of claim 18, wherein the media source comprises one of a cable television network and a direct satellite broadcast (DBS) network.

34. The method of claim 18, wherein encoding the first media signal into a first media stream comprises encoding the first media signal into an MPEG stream.

35. The method of claim 18, wherein sending the first media stream via a home network comprises sending the first media stream via one of an Ethernet and a wireless network.

36. An entertainment system comprising:
a personal computer media center comprising:
a network interface to send and receive media streams through a home network; and
a storage device to store media streams;
a set top box comprising a tuner to tune to a first media signal from a media source; and
a media center extension device lacking a tuner, wherein the media center extension device is connected to a set top box, the personal computer media center, a remote control, and a display device, and wherein the media center extension device comprises:
an input to receive the first media signal directly from the set top box;
an encoder within the media center extension device coupled to the input of the media center extension device to encode the first media signal received directly from and tuned to by the set top box into a first media stream;
a network interface coupled to the encoder to send the first media stream via a home network from the media center extension to the personal computer media center;
a decoder coupled to the network interface to decode a second media stream into a second media signal, the second media stream having been received from the network interface; and
a display interface to render the second media signal on the display device.

37. The system of claim 36, wherein the second media stream originated from the first media stream.

38. The system of claim 36, wherein the media center extension device further comprises:
a tuning controller to instruct the set top box to tune to the first media signal.

39. The system of claim 38, wherein the tuning controller comprises a remote control simulator.

40. The system of claim 38, wherein the tuning controller comprises a serial connection between the media center extension device and the set top box.

41. The system of claim 36, wherein the media center extension device further comprises:
a wireless receiver to receive user commands from the remote control device.

42. The system of claim 41, wherein the network interface of the media center extension device is to relay at least one user command to the personal computer media center.

43. The system of claim 36, wherein the media center extension device further comprises:
a conditional access device to decrypt media signals.

44. The system of claim 36, wherein the set top box comprises a conditional access device to decrypt media signals.

45. The system of claim 36, wherein the display interface is to receive graphical commands from the personal computer media center through the home network to render a graphical user interface (GUI) on the display device.

46. The system of claim 36, wherein the personal computer media center comprises a storage device to store the encoded media streams received through the home network.

47. The system of claim 36, wherein the personal computer media center comprises a personal video recording (PVR) module to selectively record media streams received through the home network, and wherein the network interface of the media center extension device is to receive a recorded media stream from the personal computer media center for the display interface to render.

48. The system of claim 36, wherein the personal computer media center comprises a media editing module to selectively edit media streams received through the home network, and wherein the network interface of the media center extension device is to receive an edited media stream from the personal computer media center for the display interface to render.

49. The system of claim 36, wherein the personal computer media center comprises a web browser coupled to an Internet connection to receive a web content, and wherein the network interface of the media center extension device is to receive graphical commands from the personal computer media center to render the web content by the display interface.

50. The system of claim 36, wherein the media center extension device is to boot from an operating system stored within the personal computer media center and received through the network interface.

51. The system of claim 36, wherein the media source is one of a cable television network and a direct satellite broadcast (DBS) network.

52. The system of claim 36, wherein the media stream comprises an MPEG stream.

53. An entertainment system comprising:
a personal computer media center comprising:
a network interface to send and receive media streams through a network; and
a storage device to store media streams; and
a plurality of media center extension devices coupled to the personal computer media center through the network, each media center extension device comprising:
an input to receive a first media signal from a media source;
an encoder coupled to the input to encode the first media signal into a first media stream;
a network interface coupled to the encoder to send the first media stream via a network to the personal computer media center;
a decoder coupled to the network interface to decode a second media stream into a second media signal, the second media stream being received via the network from the personal computer media center on the network interface; and
a display interface to render the second media signal on a display device, wherein each media center extension device is coupled to a separate display device.

54. A method for providing a home entertainment system comprising:
connecting a media center extension device to a set top box, a remote control, a display device, and to a personal computer media center using a home network;
using an encoder within the media center extension device, encoding a signal received by the media center extension device from the set top box into a stream of data, wherein the signal received by the media center extension device was tuned to using the set top box;

transporting the data stream from the media center extension device to the personal computer media center using the home network;

recording the data stream onto a storage medium in the personal computer media center;

reading the data stream from the storage medium in response to a first user request;

transporting the retrieved data stream via the home network to the media center extension device;

transforming the retrieved data stream back into a new signal; and rendering the new signal for display on a display device coupled with the media center extension device.

55. The method of claim 54, further comprising:
editing the recorded data stream prior to being retrieved in response to a second user request.

56. The method of claim 54, further comprising:
relaying the first user request from the media center extension device to the personal computer media center.

57. A media center extension device, wherein the media center extension device is connected to a set top box, a personal computer media center, a remote control, and a display device, and wherein the media center extension device comprises:

means for receiving a first media signal tuned to by a set top box directly from the set top box;

means within the media center extension device for encoding the first media signal into a first media stream;

means for sending the first media stream via a home network from the media center extension device to a personal computer media center;

means for receiving a second media stream from the personal computer media center via the home network;

means for decoding the second media stream into a second media signal; and means for rendering the second media signal for display on a display device.

58. A non-transitory computer-readable medium including computer program instructions that cause a computer to implement a method within a media center extension device for displaying media signals, wherein the media center extension device is connected to a set top box, a personal computer media center, a remote control, and a display device, and wherein the method comprises:

receiving a first media signal directly from a set top box, wherein the first media signal was tuned to by the set top box;

encoding the first media signal using an encoder within the media center extension device into a first media stream;

sending the first media stream via a home network from the media center extension device to a personal computer media center;

receiving a second media stream from the personal computer media center via the home network;

decoding the second media stream into a second media signal; and providing the second media signal for display on a display device.

* * * * *